United States Patent
Klopp et al.

(10) Patent No.: US 7,198,667 B2
(45) Date of Patent: Apr. 3, 2007

(54) SOLID PIGMENT PREPARATIONS CONTAINING PIGMENT DERIVATIVES AND SURFACE-ACTIVE ADDITIVES

(75) Inventors: Ingo Klopp, Weisenheim (DE); Juan Antonio Gonzalez Gomez, Ludwigshafen (DE); Uwe Mauthe, Mannheim (DE); Hansulrich Reisacher, Maxdorf (DE); Andreas Stohr, Freinsheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/534,298

(22) PCT Filed: Nov. 28, 2003

(86) PCT No.: PCT/EP03/13464

§ 371 (c)(1),
(2), (4) Date: May 9, 2005

(87) PCT Pub. No.: WO2004/050770

PCT Pub. Date: Jun. 17, 2004

(65) Prior Publication Data

US 2006/0112852 A1 Jun. 1, 2006

(30) Foreign Application Priority Data

Dec. 2, 2002 (DE) ............... 102 56 416

(51) Int. Cl.
C09B 67/20 (2006.01)
C09C 3/08 (2006.01)
C08K 9/04 (2006.01)

(52) U.S. Cl. .................. 106/493; 106/31.6; 106/31.65; 106/31.75; 106/31.77; 106/31.78; 106/410; 106/411; 106/412; 106/413; 106/494; 106/495; 106/496; 106/497; 106/498

(58) Field of Classification Search ................. 106/410, 106/411, 412, 413, 493, 494, 495, 496, 497, 106/498, 31.6, 31.65, 31.75, 31.77, 31.78; 524/88, 99

See application file for complete search history.

(56) References Cited

U.S. PATENT DOCUMENTS

| 4,726,847 | A | | 2/1988 | Wanser | |
|---|---|---|---|---|---|
| 5,082,498 | A | | 1/1992 | Kurtz et al. | |
| 5,264,034 | A | * | 11/1993 | Dietz et al. | 106/493 |
| 5,271,759 | A | * | 12/1993 | Wooden et al. | 106/411 |
| 5,275,653 | A | * | 1/1994 | Dietz et al. | 106/498 |
| 5,324,354 | A | * | 6/1994 | Jesse et al. | 106/413 |
| 5,472,490 | A | * | 12/1995 | Sawamura et al. | 106/413 |
| 5,472,494 | A | * | 12/1995 | Hetzenegger et al. | 106/493 |
| 5,725,649 | A | * | 3/1998 | Marr | 106/411 |
| 6,440,207 | B1 | * | 8/2002 | Schulz | 106/412 |
| 6,471,764 | B1 | * | 10/2002 | Robertson et al. | 106/493 |
| 2004/0060478 | A1 | * | 4/2004 | Weber et al. | 106/493 |
| 2005/0090609 | A1 | | 4/2005 | Reisacher et al. | |

FOREIGN PATENT DOCUMENTS

| DE | 39 26 564 | 2/1991 |
|---|---|---|
| DE | 42 14 868 | 11/1992 |
| DE | 43 21 693 | 1/1995 |
| DE | 102 04 304 | 8/2003 |
| DE | 102 27 657 | 1/2004 |
| DE | 102 28 199 | 1/2004 |
| DE | 102 33 081 | 2/2004 |
| EP | 0 395 988 | 11/1990 |

(Continued)

Primary Examiner—Anthony J. Green
(74) Attorney, Agent, or Firm—Oblon, Spivak, McClelland, Maier & Neustadt, P.C.

(57) ABSTRACT

Solid pigment preparations containing the following ingredients as substantial components: (A) 60–85 wt. % of at least one organic pigment, (B) 0.1–15 wt. % of at least one pigment derivative of general formula I wherein the variables have the following meanings: P is the radical of the parent substance of an organic pigment; $T^1$, $T^2$ independently represent a chemical bond, $-CONR^1-$ or $-SO_2NR^1-$; $B^1$, $B^2$ independently represent a chemical bond, C1–C8-alkylene or phenylene; X, Y independently represent similar or different groups $-SO_3-$ $Ka^+$ or $-COO-$ $Ka^+$; m, n represent a rational number from 0 to 3, whereby $1=m+n=4$; $Ka^+$ $H^+$, $Li^+$, $Na^+$, $K^+$, $N^+R^2R^3$ $R^4$ $R^5$ or a mixture of said cations; $R^1$ represents hydrogen; $C_1$–$C_4$-alkyl; phenyl or naphthyl which can be respectively substituted by $C_1$–$C_{18}$-alkyl; $R^2$, $R^3$, $R^4$, $R^5$ independently represent hydrogen; $C_1$–$C_{30}$-alkyl; $C_3$–$C_{30}$-alkenyl; $C_5$–$C_6$-cycloalkyl which can be substituted by $C_1$–$C_{24}$-alkyl; phenyl or naphthyl which can be respectively substituted by $C_1$–$C_{24}$-alkyl or $C_2$–$C_{24}$-alkenyl; a radical of formula $-[CHR^6-CHR^7-O]x-R^8$, wherein the repeating units $-[CHR^6-CHR^7-O]$ for x >1 can vary; $R^6$, $R^7$, $R^8$ independently represent hydrogen or $C_1$–$C_6$-alkyl; x is a whole number =1, and (C) 14.9 39.9 wt. % of at least one surface active additive from the group of non-ionic polyethers containing no primary amino groups, the acidic phosphoric acid esters, phosphonic acid esters, sulphuric acid esters and/or sulfonic acid esters thereof, the salts thereof and the condensation produces thereof with formaldehyde.

(I)

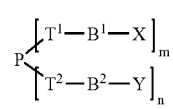

8 Claims, No Drawings

FOREIGN PATENT DOCUMENTS

| | | |
|---|---|---|
| EP | 0 504 922 | 9/1992 |
| EP | 0 621 319 | 10/1994 |
| EP | 0 636 666 | 2/1995 |
| EP | 0 761 770 | 3/1997 |
| EP | 1 132 434 | 9/2001 |
| JP | 11-323166 | 11/1999 |
| WO | 02/40596 | 5/2002 |
| WO | 02/48268 | 6/2002 |
| WO | 02/064680 | 8/2002 |

* cited by examiner

SOLID PIGMENT PREPARATIONS CONTAINING PIGMENT DERIVATIVES AND SURFACE-ACTIVE ADDITIVES

The present invention relates to solid pigment preparations comprising as essential constituents (A) from 60% to 85% by weight of at least one organic pigment, (B) from 0.1% to 15% by weight of at least one pigment derivative of the general formula I

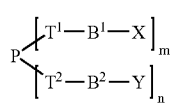

where

P is the residue of the core structure of an organic pigment;

$T^1$ and $T^2$ are independently a chemical bond, $-CONR^1-$ or $-SO_2NR^1-$;

$B^1$ and $B^2$ are independently a chemical bond, $C_1-C_8$-alkylene or phenylene;

X and Y independently represent identical or different groups $-SO_3^-Ka^+$ or $-COO^-Ka^+$;

m and n are each a rational number from 0 to 3 subject to the proviso that $1 \leq m+n \leq 4$;

$Ka^+$ is $H^+$, $Li^+$, $Na^+$, $K^+$, $N^+R^2R^3R^4R^5$ or a mixture thereof;

$R^1$ is hydrogen; $C_1-C_4$-alkyl; unsubstituted or $C_1-C_{18}$-alkyl-substituted phenyl; or unsubstituted or $C_1-C_{18}$alkyl-substituted naphthyl;

$R^2$, $R^3$, $R^4$ and $R^5$ are independently hydrogen; $C_1-C_{30}$-alkyl; $C_3-C_{30}$-alkenyl; $C_5-C_6$-cycloalkyl, unsubstituted or $C_1-C_{24}$-alkyl-substituted; unsubstituted or $C_1-C_{24}$-alkyl- or $C_2-C_{24}$-alkenyl-substituted phenyl; unsubstituted or $C_1-C_{24}$-alkyl- or $C_2-C_{24}$-alkenyl-substituted naphthyl; a radical of the formula $-[CHR^6-CHR^7-O]_x-R^8$ where the repeat units $-[CHR^6-CHR^7-O]$ can vary for $x > 1$;

$R^6$, $R^7$ and $R^8$ are independently hydrogen or $C_1-C_6$-alkyl;

x is an integer $\geq 1$, and (C) from 14.9% by weight to 39.9% by weight of at least one surface-active additive selected from the group consisting of the nonionic polyethers comprising no primary amino group, said polyethers' acidic phosphoric, phosphonic, sulfuric and/or sulfonic esters, the salts of these esters and the alkyl- and alkylarylsulfonic acids, their salts and their condensation products with formaldehyde.

The present invention further relates to the production of these pigment preparations and their use for coloration of macromolecular organic and inorganic materials and also of plastics.

Liquid systems such as coatings, varnishes, emulsion paints and printing inks are customarily pigmented using pigment formulations which comprise water, organic solvent or mixtures thereof. As well as anionic, cationic, nonionic and amphoteric dispersants, these pigment formulations generally have to be additized with further assistants, such as dried-crust inhibitors, freeze resistance enhancers, thickeners and anti-skinners, for stabilization.

There is a need for novel pigment preparations which are comparable to liquid formulations with regard to color properties and dispersibility, but do not require the additions mentioned and are easier to handle. However, simply drying liquid formulations does not provide solid pigment preparations having comparable performance properties.

The coloration of plastics requires complete dispersion of the pigment in the plastic for the development of maximum color strength and color effect. For the pulverulent pigments typically used such dispersion requires appropriate know-how and a high input of shearing energy and therefore is costly. When the plastics processor does not possess this know-how and the requisite complicated and costly dispersion equipment, the colored plastics will often contain specks of incompletely dispersed pigment agglomerates, be difficult to spin and/or possess high pressure-filter values. Many plastics processors therefore employ masterbatches. A masterbatch is a typically solid, concentrated pigment formulation in a plastics matrix which is solid at room temperature and meltable and in which the pulverulent pigment is present in a state of complete dispersion and hence in a fine state of subdivision; that is, the energy needed to disperse the pulverulent pigment has already been invested to produce the masterbatch.

A number of solid pigment preparations are known which are based on copper phthalocyanine (CuPc) pigments in particular and which comprise a derivative of the pigment as well as the pigment itself. However, they differ in the rest of their composition from the pigment preparations of the present invention.

For instance, the CuPc pigment preparations described in WO-A-02/40596 and JP-A-323 166/1999 do not comprise nonionic surface-active additive in the free state, ie not a salt of the CuPc pigment derivative, nor additional anionic surface-active additive.

The CuPc pigment preparations known from DE-A-42 14 868 and WO-A-02/48268 (or indeed the diketopyrrolopyrrole and indanthrone pigment preparations disclosed therein) do not comprise nonionic or anionic surfactants, but only cationic surfactants which have been reacted with the pigment derivative.

The CuPc pigment preparations of EP-A-621 319 include an inorganic or organic salt as an essential constituent and no surfactants.

U.S. Pat. No. 4,726,847 describes CuPc pigment preparations where the CuPc pigment derivative and the comprised anionic surfactant are laked to form the barium salt.

EP-A-761 770 discloses CuPc pigment preparations which comprise only cationic surfactants in addition to aluminum resinates as essential constituents.

WO-A-02/64680 discloses preparations of various organic pigments, but these do not comprise any surfactants. This also applies to the dioxazine and perylene pigment preparations which are disclosed in EP-A-504 922 and DE-A-39 26 564 respectively.

EP-A-636 666 and DE-A-43 21 693 describe perylene and indanthrone pigment preparations which comprise respectively a perylene or diaminoanthraquinone derivative as a pigment derivative and also a nonionic surface-active additive. However, the total amount of additive used is distinctly lower than in the case of the pigment preparations of the present invention.

These known pigment preparations all have the disadvantage of lacking simple stir-in dispersibility in liquid application media.

DE-A-102 27 657, 102 28 199 and 102 33 081, each unpublished at the priority date of the present invention, describe solid pigment preparations in granule form which comprise nonionic and/or anionic surfactants but no pigment derivatives.

It is an object of the present invention to provide solid pigment preparations having altogether advantageous performance properties, especially high color strength and particularly good dispersibility in a wide variety of application media, especially stir-in characteristics in liquid application media.

We have found that this object is achieved by solid pigment preparations comprising as essential constituents
(A) from 60% to 85% by weight of at least one organic pigment,
(B) from 0.1 % to 15% by weight of at least one pigment derivative of the general formula I

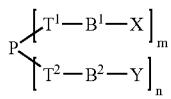

where
P is the residue of the core structure of an organic pigment;
$T^1$ and $T^2$ are independently a chemical bond, —$CONR^1$— or —$SO_2NR^1$—;
$B^1$ and $B^2$ are independently a chemical bond, $C_1$–$C_8$-alkylene or phenylene;
X and Y independently represent identical or different groups —$SO_3^-Ka^+$ or —$COO^-Ka^+$;
m and n are each a rational number from 0 to 3 subject to the proviso that $1 \leq m+n \leq 4$;
$Ka^+$ is $H^+$, $Li^+$, $Na^+$, $K^+$, $N^+R^2R^3R^4R^5$ or a mixture thereof;
$R^1$ is hydrogen; $C_1$–$C_4$-alkyl; unsubstituted or $C_1$–$C_{18}$-alkyl-substituted phenyl; or unsubstituted or $C_1$–$C_{18}$alkyl-substituted naphthyl;
$R^2$, $R^3$, $R^4$ and $R^5$ are independently hydrogen; $C_1$–$C_{30}$-alkyl; $C_3$–$C_{30}$-alkenyl; $C_5$–$C_6$-cycloalkyl, unsubstituted or $C_1$–$C_{24}$-alkyl-substituted; unsubstituted or $C_1$–$C_{24}$-alkyl- or $C_2$–$C_{24}$-alkenyl-substituted phenyl; unsubstituted or $C_1$–$C_{24}$-alkyl- or $C_2$–$C_{24}$-alkenyl-substituted naphthyl; a radical of the formula —[$CHR^6$—$CHR^7$—O]$_x$—$R^8$ where the repeat units —[$CHR^6$—$CHR^7$—O] can vary for x>1;
$R^6$, $R^7$ and $R^8$ are independently hydrogen or $C_1$–$C_6$-alkyl;
x is an integer $\geq 1$,
and
(C) from 14.9% by weight to 39.9% by weight of at least one surface-active additive selected from the group consisting of the nonionic polyethers comprising no primary amino group, said polyethers' acidic phosphoric, phosphonic, sulfuric and/or sulfonic esters, the salts of these esters and the alkyl- and alkylarylsulfonic acids, their salts and their condensation products with formaldehyde.

The present invention further provides a process for producing the pigment preparations, which comprises wet-comminuting the pigment (A) in aqueous suspension which comprises some or all of additive (C) and, if desired, some or all of pigment derivative (B) and also, if desired, prior or subsequent neutralization of the suspension with a base and then drying the suspension, if necessary after the rest of pigment derivative (B) and additive (C) has been added.

The present invention further provides a process for coloration of macromolecular organic and inorganic materials, which comprises incorporating the pigment preparations in these materials by stirring or shaking.

The present invention lastly provides a process for coloration of plastics, which comprises incorporating the pigment preparations in the plastics by extruding, rolling, kneading or milling.

The pigment preparations of the present invention comprise as essential constituents a pigment (A), a pigment derivative (B) and a water-soluble surface-active additive (C).

Component (A) in the pigment preparations of the present invention is at least one organic pigment. It will be appreciated that the pigment preparations of the present invention may also comprise mixtures of various organic pigments. In principle it is also possible for mixtures of organic pigments with inorganic pigments, especially with inorganic white pigments or fillers, to be comprised.

The pigments (A) are present in a finely divided form. Their average particle size is accordingly in general in the range from 0.01 to 5 μm and especially in the range from 0.05 to 3 μm.

The organic pigments are typically organic chromatic and black pigments. Inorganic pigments can likewise be color pigments (chromatic, black and white pigments) and also luster pigments and the inorganic pigments typically used as fillers.

There now follow examples of suitable organic color pigments:
monoazo pigments: C.I. Pigment Brown 25;
  C.I. Pigment Orange 5, 13, 36, 38, 64 and 67;
  C.I. Pigment Red 1, 2, 3, 4, 5, 8, 9, 12, 17, 22, 23, 31, 48:1, 48:2, 48:3, 48:4, 49, 49:1, 51:1, 52:1, 52:2, 53, 53:1, 53:3, 57:1, 58:2, 58:4, 63, 112, 146, 148, 170, 175, 184, 185, 187, 191:1, 208, 210, 245, 247 and 251;
  C.I. Pigment Yellow 1, 3, 62, 65, 73, 74, 97, 120, 151, 154, 168, 181, 183 and 191;
  C.I. Pigment Violet 32;
disazo pigments: C.I. Pigment Orange 16, 34, 44 and 72;
  C.I. Pigment Yellow 12, 13, 14, 16, 17, 81, 83, 106, 113, 126, 127, 155, 174, 176, 180 and 188;
disazo condensation pigments: C.I. Pigment Yellow 93, 95 and 128;
  C.I. Pigment Red 144, 166, 214, 220, 221, 242 and 262;
  C.I. Pigment Brown 23 and 41;
anthanthrone pigments: C.I. Pigment Red 168;
anthraquinone pigments: C.I. Pigment Yellow 147, 177 and 199;
  C.I. Pigment Violet 31;
anthrapyrimidine pigments: C.I. Pigment Yellow 108;
quinacridone pigments: C.I. Pigment Orange 48 and 49;
  C.I. Pigment Red 122, 202, 206 and 209;
  C.I. Pigment Violet 19;
quinophthalone pigments: C.I. Pigment Yellow 138;
diketopyrrolopyrrole pigments: C.I. Pigment Orange 71, 73 and 81;
  C.I. Pigment Red 254, 255, 264, 270 and 272;
dioxazine pigments: C.I. Pigment Violet 23 and 37;
  C.I. Pigment Blue 80;
flavanthrone pigments: C.I. Pigment Yellow 24;
indanthrone pigments: C.I. Pigment Blue 60 and 64;
isoindoline pigments: C.I. Pigment Orange 61 and 69;
  C.I. Pigment Red 260;
  C.I. Pigment Yellow 139 and 185;
isoindolinone pigments: C.I. Pigment Yellow 109, 110 and 173;
isoviolanthrone pigments: C.I. Pigment Violet 31;
metal complex pigments: C.I. Pigment Red 257;
  C.I. Pigment Yellow 117, 129, 150, 153 and 177;

C.I. Pigment Green 8;
perinone pigments: C.I. Pigment Orange 43;
    C.I. Pigment Red 194;
peryiene pigments: C.I. Pigment Black 31 and 32;
    C.I. Pigment Red 123, 149, 178, 179, 190 and 224;
    C.I. Pigment Violet 29;
phthalocyanine pigments: C.I. Pigment Blue 15, 15:1, 15:2, 15:3, 15:4, 15:6 and 16;
    C.I. Pigment Green 7 and 36;
pyranthrone pigments: C.I. Pigment Orange 51;
    C.I. Pigment Red 216;
pyrazoloquinazolone pigments: C.I. Pigment Orange 67;
    C.I. Pigment Red 251;
thioindigo pigments: C.I. Pigment Red 88 and 181;
    C.I. Pigment Violet 38;
triarylcarbonium pigments: C.I. Pigment Blue 1, 61 and 62;
    C.I. Pigment Green 1;
    C.I. Pigment Red 81, 81:1 and 169;
    C.I. Pigment Violet 1, 2, 3 and 27;
C.I. Pigment Black 1 (aniline black);
C.I. Pigment Yellow 101 (aldazine yellow);
C.I. Pigment Brown 22.
Examples of suitable inorganic color pigments are:
white pigments: titanium dioxide (C.I. Pigment White 6), zinc white, pigment grade zinc oxide; zinc sulfide, lithopone;
black pigments: iron oxide black (C.I. Pigment Black), iron manganese black (C.I. Pigment Black 27); carbon black (C.I. Pigment Black 7);
chromatic pigments: chromium oxide, chromium oxide hydrate green; chrome green (C.I. Pigment Green 48); cobalt green (C.I. Pigment Green 50); ultramarine green;
    cobalt blue (C.I. Pigment Blue 28 and 36; C.I. Pigment Blue 72); ultramarine blue; manganese blue,
    ultramarine violet; cobalt violet and manganese violet;
    red iron oxide (C.I. Pigment Red 101); cadmium sulfoselenide (C.I. Pigment Red 108); cerium sulfide (C.I. Pigment Red 265); molybdate red (C.I. Pigment Red 104); ultramarine red;
    brown iron oxide (C.I. Pigment Brown 6 and 7), mixed brown, spinel phases and corundum phases (C.I. Pigment Brown 29, 31, 33, 34, 35, 37, 39 and 40), chromium titanium yellow (C.I. Pigment Brown 24), chrome orange;
    cerium sulfide (C.I. Pigment Orange 75);
    yellow iron oxide (C.I. Pigment Yellow 42); nickel titanium yellow (C.I. Pigment Yellow 53; C.I. Pigment Yellow 157, 158, 159, 160, 161, 162, 163, 164 and 189); chromium titanium yellow; spinel phases (C.I. Pigment Yellow 119); cadmium sulfide and cadmium zinc sulfide (C.I. Pigment Yellow 37 and 35); chrome yellow (C.I. Pigment Yellow 34); bismuth vanadate (C.I. Pigment Yellow 184).
Examples of inorganic pigments typically used as fillers are transparent silicon dioxide, ground quartz, aluminum oxide, aluminum hydroxide, natural micas, natural and precipitated chalk and barium sulfate.
Luster pigments are platelet-shaped pigments having a monophasic or polyphasic construction whose color play is marked by the interplay of interference, reflection and absorption phenomena. Examples are aluminum platelets and aluminum, iron oxide and mica platelets bearing one or more coats, especially of metal oxides.

The pigment preparations of the present invention comprise from 60% to 85% by weight and preferably from 70% to 85% by weight of pigment (A).

Component (B) in the solid pigment preparations of the present invention is a pigment derivative of the above-defined formula I

The pigment derivatives I are based on an organic pigment's core structure P which is functionalized by a sulfonic acid and/or carboxylic acid groups which are attached to the core structure either directly or via bridging elements. The term "core structure" as used herein shall comprehend the pigments themselves and also their precursors. Pigment precursors come into consideration in the case of polycyclic pigments in particular. They have the ring structure of the pigment, but the pigment's full substitution pattern is not present and/or functionalizations are missing. Perylene-3,4-dicarboximides may be mentioned as an example of a precursor to perylene pigments based on perylene-3,4,9,10-tetracarboxylic acids and their diimides.

The pigment derivative I used as a component (B) in a particular pigment preparation can have the same pigment core structure P as the organic pigment (A). The scope for possible combinations is limited by the requirement that the colored pigment derivative (B) should not adversely affect the color due to pigment (A) in the application medium.

In principle, the core structures of pigments selected from the group consisting of the anthraquinone, quinacridone, quinophthalone, diketopyrrolopyrrole, dioxazine, flavanthrone, indanthrone, isoindoline, isoindolinone, isoviolanthrone, perinone, perylene, phthalocyanine, pyranthrone, pyrazoloquinazolone and thioindigo pigments are preferred for the pigment derivatives I. Owing to their broad utility, pigment core structures selected from the group consisting of the quinophthalone, perylene and phthalocyanine pigments are particularly preferred. Among these, it is in turn the pigment core structures selected from the group consisting of the quinophthalone and phthalocyanine pigments which are most preferred. Quinophthalone-based pigment derivatives I (especially the hereinbelow more particularly described pigment derivative Ia) are particularly useful for combination with yellow, orange and red pigments, while phthalocyanine-based pigment derivatives I (in particular the hereinbelow likewise more particularly described pigment derivative Ib) are especially useful for combination with blue, green, violet and black pigments.

Preferably, the sulfonic acid and/or carboxylic acid groups X and Y are directly attached to the pigment core structure P in the pigment derivatives I, ie $T^1$ and $B^1$ and also $T^2$ and $B^2$ are all preferably a chemical bond.

However, $T^1$ and $T^2$ may also be bridging moieties of the formula —CONR$^1$— or —SO$_2$NR$^1$— ($R^1$: hydrogen; $C_1$–$C_4$-alkyl; naphthyl or especially phenyl, which may each be substituted by $C_1$–$C_{18}$-alkyl but each preferably unsubstituted). Examples of particularly useful bridging moieties $T^1$ and $T^2$ are —CONH—, SO$_2$NH—, —CON(CH$_3$)— and —SO$_2$N(CH$_3$)—.

Similarly, $B^1$ and $B^2$ may be branched or unbranched $C_1$–$C_8$-alkylene radicals or phenylene radicals. Examples are: methylene, 1,1- and 1,2-ethylene, 1,1-, 1,2- and 1,3-propylene and 1,4-, 1,3- and 1,2-phenylene.

Examples of suitable combinations of the bridging moieties T and B are —CONH—CH$_2$—, —CON(CH$_3$)—CH$_2$—, —CONH—C$_2$H$_4$—, —CONH—CH(CH$_3$)—, —SO$_2$NH—CH$_2$—, —SO$_2$N(CH$_3$)—CH$_2$—, —SO$_2$NH—C$_2$H$_4$—, —SO$_2$NH—CH(CH$_3$)—, —CONH— 1,4-C$_6$H$_4$— and —SO$_2$NH— 1,4-C$_6$H$_4$—.

The sulfonic acid and/or carboxylic acid groups X and Y may each be present as a free acid or as a salt (Ka$^+$: Li$^+$, Na$^+$, K$^+$ or N$^+$R$^2$R$^3$R$^4$R$^5$).

The ammonium salts may be formed of unsubstituted ammonium ions, but preferably at least one of R$^2$, R$^3$, R$^4$ and R$^5$ is other than hydrogen.

Suitable aliphatic radicals R$^2$, R$^3$, R$^4$ and R$^5$ are C$_1$–C$_{30}$-alkyl and C$_3$–C$_{30}$-alkenyl radicals which may each be branched or unbranched and C$_5$–C$_6$-cycloalkyl radicals which may be substituted by C$_1$–C$_{24}$-alkyl and preferably by C$_1$–C$_{18}$-alkyl. Useful aromatic radicals are phenyl and naphthyl which may each be substituted by C$_1$–C$_{24}$-alkyl or by C$_2$–C$_{24}$-alkenyl, especially by C$_1$–C$_{18}$-alkyl or C$_2$–C$_{18}$-alkenyl. The radicals R$^2$, R$^3$, R$^4$ and R$^5$ may also be polyalkyleneoxy radicals of the formula —[CHR$^6$—CHR$^7$—O]$_x$—R$^8$ (R$^6$, R$^7$ and R$^8$: independently hydrogen, C$_1$–C$_6$-alkyl; x $\geq$1). When x is >1, the radicals can be homopolymeric, ie for example pure polyethyleneoxy or pure polypropyleneoxy radicals, or copolymeric radicals which contain the various alkyleneoxy units especially as blocks or else randomly, for example polyethyleneoxy-polypropyleneoxy radicals.

Preference is given to aromatic and particular preference to noncyclic aliphatic radicals R$^2$, R$^3$, R$^4$ and R$^5$.

Most particularly suitable ammonium salts are mono-C$_8$–C$_{30}$-alkyl- or -alkenylammonium salts, eg lauryl, stearyl, oleyl or tallow alkylammonium salts, and also quatemized ammonium salts which comprise from 24 to 42 carbon atoms in total, provided at least one and preferably two of the alkyl and/or alkenyl radicals have at least 8, preferably 12 and more preferably from 12 to 20 carbon atoms, eg dimethyidididodecyl-, dimethyidioleyl- and dimethyldistearylammonium salts.

Preferably, the sulfonic acid and/or carboxylic acid groups X and Y are not present in free form in the pigment derivatives I. When they have not already been converted to the salt, the formation of the salt and especially the formation of the sodium salt generally takes place in the course of the production of the pigment preparations for the present invention, which in this case preferably comprises a neutralizing step. When no or only incomplete salt formation has taken place and a nonionic surface-active additive (C) is used that has a basic-site, for example a nitrogen atom, the acid groups may of course also react with this additive to form a salt. However, even in this case the pigment preparations of the present invention still comprise free additive (C), preferably not less than 5% by weight of free additive (C). When the additive (C) is incapable of salt formation, the sulfonic acid and/or carboxylic acid groups may also be present as a free acid.

Mixtures of various salts will thus frequently be present. When this is the case, the preferred sodium and/or ammonium salts (especially the ammonium salts explicitly mentioned above) should at least constitute a high fraction of these mixtures.

The pigment derivatives I may comprise from 1 to 4 acid groups. Depending on the pigment core structure P, for example in the case of a phthalocyanine residue P, the pigment derivatives I can constitute random mixtures of molecules having various degrees of substitution so that the mean value of the sum m+n can be a fractional number.

Preferably, the pigment derivatives I comprise sulfonic acid groups only. In this case, a degree of substitution (m+n) in the range from 1 to 3 and especially in the range from 1 to 2 will prove particularly advantageous. When the sulfonic acid groups are present in the form of an ammonium salt (m) and optionally as sodium salt or as a free acid (n), then m is preferably in the range from 1 to 1.8 and n in the range from 0 to 0.2.

Examples of particularly suitable pigment derivatives I are:

quinophthalonesulfonic acids of the formula Ia

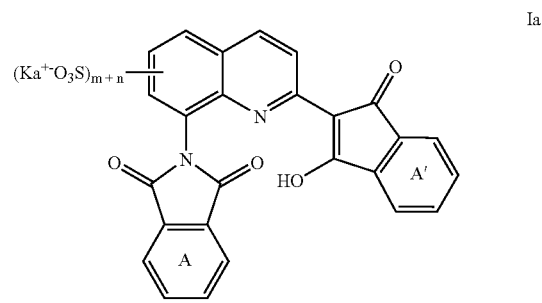

copper phthalocyaninesulfonic acids of the formula Ib

perylenesulfonic acids of the formula Ic

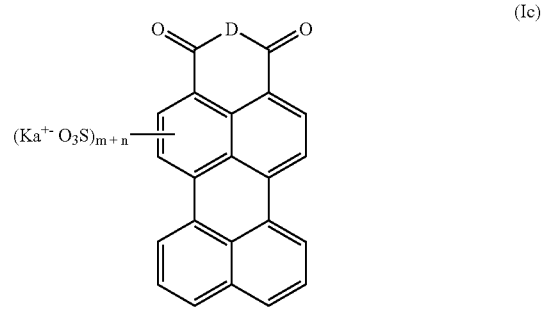

Here, Ka$^+$ and m+n have the meanings defined at the outset, although Ka is preferably Na$^+$ or N$^+$R$^2$R$^3$R$^4$R$^5$ (especially with the above-recited preferred combinations of the radicals R$^2$ to R$^5$). The sum m+n is in particular 1 in the case of the compounds Ia and Ic, and the sulfonic acid group is preferably in position 6 in the case of the compounds Ia and preferably in position 9 in the case of the compounds Ic.

Rings A and A' in the formula Ia may be the same or different and may each be substituted by from 1 to 4 chlorine and/or fluorine atoms. Preferably, each ring bears 4 chlorine atoms.

D represents —O— or —NR$^9$—, where R$^9$ is hydrogen, C$_1$–C$_4$-alkyl or unsubstituted or C$_1$–C$_4$-alkyl-substituted, C$_1$–C$_4$-alkoxy- and/or phenylazo-substituted phenyl. Preferably, R$^9$ is hydrogen, methyl, 4-ethoxyphenyl, 3,5-dimethylphenyl or 4-phenylazophenyl.

The components (B) which are most preferable are the pigment derivatives Ia and Ib where the symbols each have the preferred meanings. In this connection, the pigment derivatives Ia are preferably in the form of sodium salts and the pigment derivatives Ib may be present not only as sodium but also as ammonium salts.

The pigment derivatives I are known and can be prepared according to known methods.

The pigment preparations of the present invention comprise from 0.1% to 15% by weight and especially from 0.5% to 10% by weight of component (B). When component (B) is selected from the pigment derivatives Ia, its fraction is preferably in the range from 0.1% to 5% by weight and especially in the range from 0.5% to 4% by weight. In the case of the pigment derivatives Ib, amounts ranging from 2% to 10% by weight and especially from 3% to 8% by weight are preferred. The level of pigment derivatives Ic is preferably in the range from 0.1% to 5 weight-5 and especially in the range from 0.5% to 3% by weight.

Component (C) in the pigment preparations of the present invention is at least one surface-active additive. The surface-active additive may be a nonionic additive based on polyethers which do not comprise any primary amino groups or it may be an anionic additive based on acidic phosphoric, phosphonic, sulfuric and/or sulfonic esters of these polyethers and the salts of these esters and also on alkyl- and alkylarylsulfonic acids, their salts and their condensation products with formaldehyde. It will be appreciated that it is also possible for mixtures of various nonionic surface-active additives, mixtures of various anionic surface-active additives or else mixtures of nonionic and anionic surface-active additives to be comprised in the pigment preparations of the present invention.

Water-soluble additives (C) are particularly useful in waterborne application media in particular. Preference is here given to additives (C) which permit the preparation of at least 5% by weight and especially at least 10% by weight aqueous solutions.

The polyethers underlying the additives (C) are in particular polyalkylene oxides, especially alkylene oxide block copolymers, or reaction products of alkylene oxides with alcohols, amines, aliphatic carboxylic acids and carboxamides. For the purposes of the present invention, the term "alkylene oxide" as used herein shall also comprehend aryl-substituted alkylene oxide, especially phenyl-substituted ethylene oxide.

As well as unmixed polyalkylene oxides, preferably $C_2$–$C_4$-alkylene oxides and phenyl-substituted $C_2$–$C_4$-alkylene oxides, especially polyethylene oxides, polypropylene oxides and poly(phenylethylene oxide)s, it is in particular block copolymers, especially polymers having polypropylene oxide and polyethylene oxide blocks or poly(phenylethylene oxide) and polyethylene oxide blocks, and also random copolymers of these alkylene oxides which are suitable.

These polyalkylene oxides are preparable by polyaddition of alkylene oxides onto initiator molecules, as onto saturated or unsaturated aliphatic and aromatic alcohols, saturated or unsaturated aliphatic and aromatic amines, saturated or unsaturated aliphatic carboxylic acids and carboxamides. It is customary to use from 1 to 300 mol and preferably from 3 to 150 mol of alkylene oxide per mole of initiator molecule.

Suitable aliphatic alcohols comprise in general from 6 to 26 carbon atoms and preferably from 8 to 18 carbon atoms and can have an unbranched, branched or cyclic structure. Examples are octanol, nonanol, decanol, isodecanol, undecanol, dodecanol, 2-butyloctanol, tridecanol, isotridecanol, tetradecanol, pentadecanol, hexadecanol (cetyl alcohol), 2-hexyldecanol, heptadecanol, octadecanol (stearyl alcohol), 2-heptylundecanol, 2-octyldecanol, 2-nonyltridecanol, 2-decyltetradecanol, oleyl alcohol and 9-octadecenol and also mixtures of these alcohols, such as $C_8$/$C_{10}$, $C_{13}$/$C_{15}$ and $C_{16}$/$C_{18}$ alcohols, and cyclopentanol and cyclohexanol. Of particular interest are the saturated or unsaturated fatty alcohols obtained from natural raw materials by fat hydrolysis and reduction and the synthetic fatty alcohols from the oxo process. The alkylene oxide adducts with these alcohols typically have average molecular weights $M_n$ from 200 to 5 000.

Examples of the abovementioned aromatic alcohols include not only α- and β-naphthol and their $C_1$–$C_4$-alkyl derivatives but also in particular phenol and its $C_1$–$C_{12}$-alkyl derivatives, such as hexylphenol, heptylphenol, octylphenol, nonylphenol, isononylphenol, undecylphenol, dodecylphenol, di- and tributylphenol and dinonylphenol, and its arylalkyl derivatives, especially its hydroxyphenylmethyl derivatives, the methyl group of which can be substituted by two $C_1$–$C_8$-alkyl radicals but preferably carries two methyl radicals (bisphenol A).

Suitable aliphatic amines correspond to the abovementioned aliphatic alcohols. Again of particular importance here are the saturated and unsaturated fatty amines which preferably have from 14 to 20 carbon atoms. Examples of suitable aromatic amines are aniline and its derivatives.

Useful aliphatic carboxylic acids include especially saturated and unsaturated fatty acids which preferably comprise from 14 to 20 carbon atoms and fully hydrogenated, partially hydrogenated and unhydrogenated resin acids and also polyfunctional carboxylic acids, for example dicarboxylic acids, such as maleic acid.

Suitable carboxamides are derived from these carboxylic acids.

As well as alkylene oxide adducts with monofunctional amines and alcohols it is alkylene oxide adducts with at least bifunctional amines and alcohols which are of very particular interest.

The at least bifunctional amines preferably have from 2 to 5 amine groups and conform in particular to the formula $H_2N$—($R^{10}$—$NR^{11}$)p—H ($R^{10}$: $C_2$–$C_6$-alkylene; $R^{11}$: hydrogen or $C_1$–$C_6$-alkyl; p: 1–5). Specific examples are: ethylenediamine, diethylenetriamine, triethylenetetramine, tetraethylenepentamine, 1,3-propylenediamine, dipropylenetriamine, 3-amino-1-ethyleneamino-propane, hexamethylenediamine, dihexamethylenetriamine, 1,6-bis(3-aminopropylamino)hexane and N-methyidipropylenetriamine, of which hexamethylenediamine and diethylenetriamine are more preferable and ethylenediamine is most preferable.

These amines are preferably reacted first with propylene oxide and then with ethylene oxide. The ethylene oxide content of the block copolymers is typically about 10% to 90% by weight.

The average molecular weights $M_n$ of the block copolymers based on polyamines are generally in the range from 1 000 to 40 000 and preferably in the range from 1 500 to 30 000.

The at least bifunctional alcohols preferably have from two to five hydroxyl groups. Examples are $C_2$–$C_6$-alkylene glycols and the corresponding di- and polyalkylene glycols, such as ethylene glycol, 1,2-propylene glycol, 1,3-propylene glycol, 1,2-butylene glycol, 1,4butylene glycol, 1,6-hexylene glycol, dipropylene glycol and polyethylene glycol, glycerol and pentaerythritol, of which ethylene glycol and polyethylene glycol are more preferable and propylene glycol and dipropylene glycol are most preferable.

Particularly preferred alkylene oxide adducts with at least bifunctional alcohols have a central polypropylene oxide block, ie are based on a propylene glycol or polypropylene glycol which is initially reacted with further propylene oxide and then with ethylene oxide. The ethylene oxide content of the block copolymers is typically in the range from 10% to 90% by weight.

The average molecular weights $M_n$ of the block copolymers based on polyhydric alcohols are generally in the range from 1 000 to 20 000 and preferably in the range from 1 000 to 15 000.

Such alkylene oxide block copolymers are known and commercially available for example under the names of Tetronic® and Pluronic® (BASF).

An important group of anionic surface-active additives (C) is constituted by the phosphates, phosphonates, sulfates and sulfonates of nonionic polyethers, of which phosphates and sulfates are preferred.

These are convertible by reaction with phosphoric acid, phosphorus pentoxide and phosphonic acid on the one hand or with sulfuric acid and sulfonic acid on the other into phosphonic mono- or diesters and phosphonic esters on the one hand and sulfuric monoesters and sulfonic esters on the other. These acidic esters are preferably present in the form of water-soluble salts, especially as alkali metal salts, in particular sodium salts, and ammonium salts, but can also be used in the form of the free acids.

Preferred phosphates and phosphonates are derived in particular from alkoxylated and especially ethoxylated fatty and oxo process alcohols, alkylphenols, fatty amines, fatty acids and resin acids, while preferred sulfates and sulfonates are based in particular on alkoxylated and especially ethoxylated fatty alcohols, alkylphenols and amines, including polyfunctional amines.

A further important group of anionic surface-active additives (C) is that constituted by aromatic sulfonates, such as p-$C_8$–$C_{20}$-alkylbenzenesulfonates, di-($C_1$–$C_8$-alkyl)naphthalenesulfonates and condensation products of naphthalenesulfonic acids with formaldehyde, and aliphatic sulfonates, such as $C_{12}$–$C_{18}$-alkanesulfonates, α-sulfo fatty acid $C_2$–$C_8$-alkyl esters, sulfosuccinic esters and alkoxy-, acyloxy- and acylaminoalkanesulfonates, which are preferably likewise used in the form of their water-soluble sodium salts.

Preference is here given to aryl sulfonates, and di-($C_1$–$C_8$-alkyl)naphthalenesulfonates are particularly preferred. Very particular preference is given to diisobutyl- and diisopropyl-naphthalenesulfonate.

Such anionic surface-active additives are known and commercially available for example under the names of Crodafos® (Croda), Rhodafac® (Rhodia), Maphos® (BASF), Texapon® (Cognis), Empicol® (Albright & Wilson), Matexil® (ICI), Soprophor® (Rhodia), Lutensit® (BASF), Nekal® (BASF) and Tamol® (BASF).

The pigment preparations of the present invention comprise from 14.9% to 34.9% by weight and preferably from 17% to 25% by weight of the surface-active additive (C). As mentioned above, a nonionic additive (C) which has a basic site capable of salt formation may react with unneutralized pigment derivative (B) to form a salt. Care must be taken in this case to ensure that the pigment preparation still comprises free additive (nonionic and/or anionic additive (C)). Preferably, at least 5% by weight of additive (C) is present in free form.

The pigment preparations of the present invention may comprise nonionic additive (C) alone, anionic additive (C) alone or mixtures of nonionic and anionic additive (C). For example, anionic additives based on the preferred phosphoric and sulfuric esters of nonionic polyethers may be used in pure form or in mixtures with nonionic and/or further anionic additives (C). The ester fraction of these mixtures may be in the range from 5% to 90% by weight. Anionic additives (C) which are based on aryl sulfonates are preferably used in mixture with nonionic and/or further anionic additives (C), in which case their fraction in the mixtures is generally in the range from 5% to 20% by weight.

The pigment preparations of the present invention are advantageously obtainable by the production process of the present invention by wet-comminuting the pigment (A) in an aqueous suspension which comprises some but preferably all of additive (C) and then drying the suspension, if necessary after the rest of additive (C) has been added.

The pigment derivative (B) may be added to the suspension in this production process before, during or after the wet-comminuting operation, or even if desired in portions at various times. Preferably, at least some but preferably all of pigment derivative (B) is added before the wet-comminuting operation. It is also possible to add the pigment derivative (B) to a suspension of the pigment (A), to filter off the pigment coated with the pigment derivative (B) and to feed the moist presscake, if desired after partial or full drying, to a wet-comminuting operation.

The pigment (A) can be used in the process of the present invention as a dry powder or in the form of a presscake. Preferably, the pigment (A) is used in the form of a finished product, ie the primary particle size of the pigment has already been adjusted to the desired application value. This finish, which may also be carried out in the presence of pigment derivative (B), has to be carried out in the case of organic pigments especially, since the as-synthesized crude material is not suitable for use. Since the finished pigment (A) typically reagglomerates in the course of drying or on the filter assembly, it is subjected to wet comminution, for example grinding in a stirred media mill, in aqueous suspension.

The wet-comminuting operation can be carried out at various pH values. For drying, however, the suspension should have a pH of approximately 7, ie be neutralized. In general (and especially with the use of the pigment derivatives (B) in the form of the free acid) this will require the addition of a base, especially of aqueous sodium hydroxide solution, before or after the wet-comminuting operation. Preferably, however, the base is added before the wet-comminuting operation.

The particle size of the pigment preparations of the present invention can be controlled to a specifically targeted value, depending on the method which is chosen for drying—spray granulation and fluidized bed drying, spray drying, drying in a paddle dryer, evaporation and subsequent comminution. The operation can be carried out not only in the air but also under inert gas, preferably nitrogen.

Spray and fluidized bed granulation may produce coarsely divided granules having average particle sizes from 50 to 5 000 μm and especially from 100 to 1 000 μm. Spray drying typically produces granules having average particle sizes <20 μm. Finely divided preparations are obtainable by drying in a paddle dryer and by evaporation with subsequent grinding. Preferably, however, the pigment preparations of the present invention are in granule form.

Spray granulation is preferably carried out in a spray tower using a one-material nozzle. Here, the suspension is sprayed in the form of relatively large drops, and the water evaporates. The additive (C) melts at the drying temperatures and so leads to the formation of a substantially spherical granule having a particularly smooth surface (BET values generally $\leq 15$ m$^2$/g, and especially $\leq 10$ m$^2$/g).

The gas inlet temperature in the spray tower is generally in the range from 180 to 300° C. and preferably in the range from 150 to 300° C. The gas outlet temperature is generally in the range from 70 to 150° C. and preferably in the range from 70 to 130° C.

The residual moisture content of the granular pigment obtained is preferably <2% by weight.

The pigment preparations of the present invention are notable in use for their excellent color properties which are comparable to those of liquid pigment formulations, especially with regard to color strength, brilliance, hue and hiding power, and in particular for their stir-in characteristics, ie they can be dispersed in application media with a minimal input of energy, simply by stirring or shaking. This applies in particular to the coarsely divided pigment granules, which constitute the preferred embodiment of the pigment preparations of the present invention.

Compared with liquid pigment formulations, the pigment preparations of the present invention additionally have the following advantages: They have a higher pigment content. Whereas liquid formulations tend to change viscosity during storage and have to be admixed with preservatives and agents for enhancing the resistance to freezing and/or drying out (crusting), the pigment preparations of the present invention exhibit very good stability in storage. They are both economically and ecologically advantageous with regard to packaging, storage and transportation. Since they are solvent free, they are more flexible in use.

The pigment preparations of the present invention which are in granule form are notable for excellent attrition resistance, a minimal tendency to compact or clump, uniform particle size distribution, good pourability, flowability and meterability and also dustlessness in handling and application.

The pigment preparations of the present invention are very useful for pigmenting macromolecular organic and inorganic materials of any kind. Liquid application media in this context can also be purely aqueous; comprise mixtures of water and organic solvents, for example alcohols; or be based exclusively on organic solvents, such as alcohols, glycol ethers, ketones, eg methyl ethyl ketone, amides, eg N-methylpyrrolidone and dimethylformamide, esters, eg ethyl acetate, butyl acetate and methoxypropyl acetate, or aromatic or aliphatic hydrocarbons, eg xylene, mineral oil and mineral spirits.

If desired, the preparations can initially be stirred into a solvent which is compatible with the particular application medium, and this stirring into the solvent is again possible with minimal input of energy, and then be introduced into this application medium. For instance, slurries of pigment preparations in glycols or other solvents customary in the paint and coatings industry, such as methoxypropyl acetate, can be used to render the pigment preparations adapted to aqueous systems compatible with hydrocarbonaceous systems or systems based on nitrocellulose.

Examples of materials which can be pigmented with the pigment preparations of the present invention include: coatings, for example architectural coatings, industrial coatings, automotive coatings, radiation-curable coatings; paints, including paints for building exteriors and building interiors, for example wood paints, lime washes, distempers, emulsion paints; solventborne printing inks, for example offset printing inks, flexographic printing inks, toluene gravure printing inks, textile printing inks, radiation-curable printing inks; waterborne inks, including inkjet inks; color filters; building materials (water is typically added only after building material and granular pigment have been dry mixed), for example silicate render systems, cement, concrete, mortar, gypsum; bitumen, caulks; cellulosic materials, for example paper, paperboard, cardboard, wood and woodbase, which can each be coated or otherwise finished; adhesives; film-forming polymeric protective colloids as used for example in the pharmaceutical industry, cosmetic articles; detergents.

The pigment preparations of the present invention are particularly useful as mixing components in color-mixing or -matching systems. Owing to their stir-in characteristics, they can be used directly as a solid for this purpose. If desired, however, they can also be first converted into tinting colors (especially into colors having a high solids content, "HS colors"), or even more highly pigmented tinting pastes which then constitute the components of the mixing system. The matching of the desired hue and hence the mixing of the color components can be effected visually via a system of color cards in a very large number of hue gradations which are based on color standards, such as RAL, BS and NCS, or preferably under computer control, whereby an unlimited number of hues become accessible ("computer color matching").

The pigment preparations are very useful for coloring plastics of all kinds. The following classes and types of plastics may be mentioned by way of example:

modified natural materials:

thermosets, eg casein plastics; thermoplastics, eg cellulose nitrate, cellulose acetate, cellulose mixed esters and cellulose ethers;

synthetic plastics:

polycondensates: thermosets, eg phenolic resin, urea resin, thiourea resin, melamine resin, unsaturated polyester resin, allylic resin, silicone, polyimide and polybenzimidazole; thermoplastics, eg polyamide, polycarbonate, polyester, polyphenylene oxide, polysulfone and polyvinyl acetal;

addition polymers: thermoplastics, eg polyolefins, such as polyethylene, polypropylene, poly-1-butene and poly-4-methyl-1-pentene, ionomers, polyvinyl chloride, polyvinylidene chloride, polymethyl methacrylate, polyacrylonitrile, polystyrene, polyacetal, fluoropolymers, polyvinyl alcohol, polyvinyl acetate and poly-p-xylylene and also copolymers, such as ethylene-vinyl acetate copolymers, styrene-acrylonitrile copolymers, acrylonitrile-butadiene-styrene copolymers, polyethylene glycol terephthalate and polybutylene glycol terephthalate;

polyadducts: thermosets, eg epoxy resin and crosslinked polyurethanes; thermoplastics, eg linear polyurethanes and chlorinated polyethers.

Advantageously, plastics are colorable with the pigment preparations of the present invention by minimal energy input, for example by conjoint extrusion (preferably using a single- or twin-screw extruder), rolling, kneading or grinding. The plastics can be present at that stage as plastically deformable masses or melts and be processed into moldings, film and fiber.

The pigment preparations of the present invention are additionally notable for altogether advantageous application properties, especially for good color properties, in particular high color strength and brilliance, and the good rheological properties of the plastics which have been colored with them, especially for low pressure-filter values (high filter lifetimes) and good spinnability.

EXAMPLES

Production and Testing of Inventive Pigment Preparations in Granule Form

The pigment preparations were produced by ball milling a suspension of x kg of finished pigment (A), y kg of pigment derivative (B) and z kg of optionally plural additives (C) in 150 kg of water, if necessary adjusted to pH 7 by addition of 25% by weight aqueous sodium hydroxide solution, to a $d_{50}$ value <1 µm and then spray granulating the millbase in a spray tower using a one-material nozzle at a gas inlet temperature of 165° C. and a gas outlet temperature of 70° C.

In examples 39 to 41, pigment (A) was initially coated with the pigment derivative (B) in an aqueous suspension at pH 8, the coated pigment was filtered off and the presscake was then (after prior drying in example 41) sent for milling in the presence of additive (C).

The color strength of the pigment granules was determined calorimetrically in white reduction (reported in terms of the DIN 55986 coloring equivalences) in a waterborne emulsion paint. To this end, a mixture of in each case 1.25 g of granular pigment and 50 g of a waterborne styrene/acrylate-based test binder having a white pigment content of 16.4% by weight ($TiO_2$, Kronos 2043) (BASF test binder 00-1067) was homogenized in a 150 ml plastic cup by running a high speed stirrer at 1500 rpm for 3 min. The color obtained was then drawn down on a black and white test card using a 100 µm wire-wound film applicator and dried for 30 min.

The respective analogous emulsion paints prepared using commercially available aqueous formulations of the pigments were assigned the CE value 100 (standard). CE values <100 denote a higher color strength than standard. CE values >100 accordingly denote a lower color strength.

The pigment granules obtained exhibited excellent stability in storage.

The table hereinbelow lists the compositions of the pigment preparations produced and also the CE values obtained in each case.

The pigment derivatives (B) used were as follows:
B1: quinophthalonesulfonic acid (Ia) (WO-A02/00643, example 1)
B2: CuPc-sulfonic acid (Ib) having a degree of substitution of about 1.4
B3: CuPc-sulfonic acid (Ib) having a degree of substitution of about 1.7
B4: monolaurylammonium salt of a CuPc-sulfonic acid (Ib) having a degree of substitution of about 1.4 (similarly to GB-A-1 508 576, agent A)
B5: dimethyidistearylammonium salt of a CuPc-sulfonic acid (Ib) having a degree of substitution of about 1.4 (similarly to GB-A-1 508 576, agent B)
B6: reaction product of a CuPc-sulfonic acid having a degree of substitution of about 1.7 with 0.6 mol of laurylammonium chloride
B7: perylene-3,4-dicarboximide-9-sulfonic acid (EP-A-636 666, derivative b2)

The additives (C) used were as follows:
C1: ethoxylated $C_{13}/C_{15}$ oxo alcohol having an average degree of ethoxylation of 30
C2: ethoxylated linear saturated $C_{16}/C_{18}$ fatty alcohol having an average degree of ethoxylation of 25
C3: ethoxylated linear saturated $C_{16}/C_{18}$ fatty alcohol having an average degree of ethoxylation of 50
C4: block copolymer based on ethylenediamine/propylene oxide/ethylene oxide, having an ethylene oxide content of 40% by weight and an average molecular weight $M_n$ of 12 000
C5: block copolymer based on ethylenediamine/propylene oxide/ethylene oxide, having an ethylene oxide content of 40% by weight and an average molecular weight $M_n$ of 6 700
C6: ethoxylated saturated isotridecyl alcohol having an average degree of ethoxylation of 20
C7: propylene oxide-ethylene oxide copolymer having a central propylene oxide block, an ethylene oxide content of 50% by weight and an average molecular weight $M_n$ of 6 500
C8: ethoxylated bisphenol A having an average degree of ethoxylation of 7
C9: sodium salt of a monosulfated ethoxylated tetraphenylethyl-substituted bisphenol A (70 mol EO/mol bisphenol A) (U.S. Pat. No. 4,218,218, dispersant 13)
C10: acidic phosphoric ester based on an initially propoxylated and then ethoxylated $C_8/C_{10}$ oxo alcohol (12 mol PO and 6 mol EO/mol oxo alcohol)
C11: diisobutyinaphthalenesulfonic acid, sodium salt

TABLE

| Ex. | Pigment (A) | x kg | (B) | y kg | (C) | z' kg | (C) | z'' kg | (C) | z''' kg | CE |
|---|---|---|---|---|---|---|---|---|---|---|---|
| 1 | P.R. 112 | 75.0 | B1 | 2.0 | C1 | 23.0 | | | | | 100 |
| 2 | P.R. 112 | 75.0 | B1 | 2.0 | C2 | 23.0 | | | | | 107 |
| 3 | P.R. 112 | 75.0 | B1 | 2.0 | C3 | 23.0 | | | | | 101 |
| 4 | P.R. 112 | 78.0 | B1 | 2.0 | C4 | 10.0 | C6 | 10.0 | | | 103 |
| 5 | P.R. 112 | 75.0 | B1 | 2.0 | C4 | 23.0 | | | | | 104 |
| 6 | P.R. 112 | 75.0 | B1 | 2.0 | C7 | 23.0 | | | | | 97 |
| 7 | P.R. 112 | 74.0 | B1 | 3.0 | C7 | 23.0 | | | | | 99 |
| 8 | P.R. 112 | 73.0 | B1 | 2.0 | C9 | 25.0 | | | | | 98 |
| 9 | P.R. 112 | 73.0 | B1 | 2.0 | C6 | 10.0 | C4 | 15.0 | | | 105 |
| 10 | P.R. 112 | 76.0 | B1 | 4.0 | C6 | 10.0 | C4 | 10.0 | | | 101 |
| 11 | P.R. 112 | 75.0 | B1 | 2.0 | C6 | 23.0 | | | | | 99 |
| 12 | P.R. 112 | 77.0 | B7 | 3.0 | C4 | 20.0 | | | | | 102 |
| 13 | P.Y. 74 | 73.1 | B1 | 1.5 | C1 | 22.9 | C11 | 2.6 | | | 80 |
| 14 | P.Y. 74 | 76.4 | B1 | 1.6 | C1 | 20.0 | C9 | 2.0 | | | 98 |
| 15 | P.Y. 74 | 73.5 | B1 | 1.5 | C2 | 25.0 | | | | | 98 |
| 16 | P.Y. 74 | 75.9 | B1 | 1.6 | C2 | 19.9 | C11 | 2.6 | | | 95 |
| 17 | P.Y. 74 | 72.8 | B1 | 2.3 | C2 | 24.0 | C11 | 1.0 | | | 90 |
| 18 | P.Y. 74 | 73.5 | B1 | 1.5 | C3 | 25.0 | | | | | 105 |
| 19 | P.Y. 74 | 74.5 | B1 | 1.5 | C3 | 23.0 | C11 | 1.0 | | | 93 |
| 20 | P.Y. 74 | 77.2 | B1 | 0.8 | C4 | 19.5 | C11 | 2.5 | | | 88 |
| 21 | P.Y. 74 | 78.4 | B1 | 1.6 | C4 | 10.0 | C1 | 10.0 | | | 102 |
| 22 | P.Y. 74 | 78.4 | B1 | 1.6 | C4 | 10.0 | C6 | 10.0 | | | 102 |
| 23 | P.Y. 74 | 78.4 | B1 | 1.6 | C7 | 10.0 | C1 | 5.0 | C6 | 5.0 | 105 |
| 24 | P.V. 23 | 73.5 | B3 | 1.5 | C4 | 25.0 | | | | | 103 |

TABLE-continued

| | Pigment | | Pigment derivative | | Additives | | | | | |
|---|---|---|---|---|---|---|---|---|---|---|
| Ex. | (A) | x kg | (B) | y kg | (C) | z' kg | (C) | z" kg | (C) | z''' kg | CE |
| 25 | P.V. 23 | 73.5 | B3 | 1.5 | C8 | 25.0 | | | | | 98 |
| 26 | P.Y. 138 | 82.5 | B1 | 0.5 | C7 | 17.0 | | | | | 92 |
| 27 | P.Y. 138 | 79.0 | B1 | 1.0 | C7 | 5.0 | C10 | 15.0 | | | 101 |
| 28 | P.Y. 138 | 79.0 | B1 | 1.0 | C7 | 15.0 | C10 | 5.0 | | | 91 |
| 29 | P.B. 15 | 75.1 | B4 | 4.9 | C4 | 20.0 | | | | | 93 |
| 30 | P.B. 15:1 | 75.0 | B4 | 5.0 | C2 | 20.0 | | | | | 101 |
| 31 | P.B. 15:1 | 75.0 | B4 | 5.0 | C4 | 20.0 | | | | | 97 |
| 32 | P.B. 15:1 | 73.1 | B4 | 3.9 | C4 | 23.0 | | | | | 106 |
| 33 | P.B. 15:1 | 76.0 | B3 | 4.0 | C4 | 20.0 | | | | | 104 |
| 34 | P.B. 15:1 | 76.0 | B2 | 4.0 | C4 | 20.0 | | | | | 105 |
| 35 | P.B. 15:1 | 72.1 | B5 | 5.4 | C4 | 22.5 | | | | | 100 |
| 36 | P.B. 15:2 | 72.7 | B2 | 4.5 | C4 | 22.7 | | | | | 102 |
| 37 | P.B. 15:2 | 70.3 | B4 | 4.7 | C4 | 25.0 | | | | | 102 |
| 38 | P.B. 15:2 | 75.0 | B4 | 5.0 | C4 | 20.0 | | | | | 93 |
| 39 | P.B. 15:2 | 75.0 | B6 | 5.0 | C4 | 20.0 | | | | | 102 |
| 40 | P.B. 15:2 | 75.0 | B3 | 5.0 | C4 | 19.9 | | | | | 98 |
| 41 | P.B. 15:2 | 75.0 | B3 | 5.0 | C4 | 20.0 | | | | | 98 |
| 42 | P.O. 67 | 76.0 | B1 | 2.0 | C4 | 22.0 | | | | | 88 |
| 43 | P.O. 67 | 76.0 | B1 | 2.0 | C5 | 22.0 | | | | | 93 |
| 44 | P.O. 67 | 75.0 | B1 | 3.0 | C5 | 22.0 | | | | | 93 |
| 45 | P.O. 67 | 75.0 | B1 | 3.0 | C3 | 22.0 | | | | | 91 |
| 46 | P.O. 67 | 76.0 | B1 | 2.0 | C8 | 22.0 | | | | | 84 |

We claim:
1. A solid pigment preparation comprising:
   (A) from 60% to 85% by weight of at least one organic pigment,
   (B) from 0.1% to 15% by weight of at least one pigment derivative of the general formula I

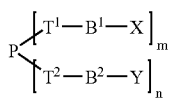

where
P is a core structure of an organic pigment selected from the group consisting of quinophthalone and phthalocyanine pigments;
$T^1$ and $T^2$ are independently a chemical bond, —CONR$^1$— or —SO$_2$NR$^1$—;
$B^1$ and $B^2$ are independently a chemical bond, $C_1$–$C_8$-alkylene or phenylene;
X and Y independently represent identical or different groups —SO$_3^-$Ka$^+$ or —COO$^-$Ka$^+$;
m and n are each a rational number from 0 to 3 subject to the proviso that $1 \leq m+n \leq 4$;
Ka$^+$ is H$^+$, Li$^+$, Na$^+$, K$^+$, N$^+$R$^2$R$^3$R$^4$R$^5$ or a mixture thereof;
R$^1$ is hydrogen; $C_1$–$C_4$-alkyl; unsubstituted or $C_1$–$C_{18}$-alkyl-substituted phenyl; or unsubstituted or $C_1$–$C_{18}$-alkyl-substituted naphthyl;
R$^2$, R$^3$, R$^4$ and R$^5$ are independently hydrogen; $C_1$–$C_{30}$-alkyl; $C_3$–$C_{30}$-alkenyl; $C_5$–$C_6$-cycloalkyl, unsubstituted or $C_1$–$C_{24}$-alkyl-substituted; unsubstituted or $C_1$–$C_{24}$-alkyl- or $C_2$–$C_{24}$-alkenyl-substituted phenyl; unsubstituted or $C_1$–$C_{24}$-alkyl- or $C_2$–$C_{24}$-alkenyl-substituted naphthyl; a radical of the formula —[CHR$^6$—CHR$^7$—O]$_x$—R$^8$ where the repeat units —[CHR$^6$—CHR$^7$—O] can vary for x >1;
R$^6$, R$^7$ and R$^8$ are independently hydrogen or $C_1$–$C_6$-alkyl;
x is an integer $\geq 1$, and
   (C) from 14.9% by weight to 39.9% by weight of at least one surface-active additive selected from the group consisting of the nonionic polyethers comprising no primary amino group, said polyethers' acidic phosphoric, phosphonic, sulfuric and/or sulfonic esters, the salts of these esters, and alkyl- and alkylarylsulfonic acids, the salts of these acids and their condensation products with formaldehyde.

2. The solid pigment preparation as claimed in claim 1 in the form of granules having an average particle size from 50 to 5 000 μm and a BET surface area of $\leq 15$ m$^2$/g.

3. The solid pigment preparation as claimed in claim 1, wherein component (C) is at least one additive selected from the group consisting of the alkylene oxide copolymers, the reaction products of alkylene oxides with alcohols, amines, aliphatic carboxylic acids or carboxamides, the acidic phosphoric, phosphonic, sulfuric and sulfonic esters of these alkylene oxide compounds, the salts of these esters, and alkylphenyl- and alkylnaphthalenesulfonic acids, the salts of these acids and their condensation products with formaldehyde.

4. A process for producing pigment preparations as claimed in claim 1, comprising wet-comminuting the pigment (A) in aqueous suspension which comprises additive (C) and, optionally, pigment derivative (B) and also, optionally prior or subsequent neutralization of the suspension with a base and then drying the suspension, after the rest of pigment derivative (B) and additive (C) has been added.

5. A process for coloration of macromolecular organic and inorganic materials, comprising incorporating pigment preparations as claimed in claim 1 in these materials by stirring or shaking.

6. The process as claimed in claim 5 for coloration of coatings, paints, inks, and finish systems, comprising a liquid phase, wherein the liquid phase comprises water, organic solvents or mixtures of water and organic solvents.

7. A process for coloration of macromolecular organic and inorganic materials with color-mixing systems, comprising utilizing pigment preparations as claimed in claim 1 as mixing components.

8. A process for coloration of plastics, comprising incorporating pigment preparations as claimed in claim 1 in the plastics by extruding, rolling, kneading or milling.

* * * * *